United States Patent [19]

van Heyningen

[11] Patent Number: 4,849,764

[45] Date of Patent: Jul. 18, 1989

[54] INTERFERENCE SOURCE NOISE CANCELLING BEAMFORMER

[75] Inventor: Arent H. K. van Heyningen, Newport, R.I.

[73] Assignee: Raytheon Company, Lexington, Mass.

[21] Appl. No.: 308,992

[22] Filed: Feb. 7, 1989

Related U.S. Application Data

[63] Continuation of Ser. No. 81,215, Aug. 4, 1987, abandoned.

[51] Int. Cl.$^4$ .................................................. G01S 3/16
[52] U.S. Cl. ...................................... 342/381; 342/384
[58] Field of Search ................. 342/381, 384; 367/126

[56] References Cited

U.S. PATENT DOCUMENTS

| | | | |
|---|---|---|---|
| 3,068,474 | 12/1962 | Higgins et al. | 367/126 |
| 4,017,867 | 4/1977 | Claus | 342/384 |
| 4,274,148 | 6/1981 | Hullenaar | 342/384 |
| 4,516,126 | 5/1985 | Masak et al. | 342/384 |
| 4,697,188 | 9/1987 | Lin | 342/384 |

Primary Examiner—Thomas H. Tarcza
Assistant Examiner—David Cain
Attorney, Agent, or Firm—Martin M. Santa; Richard M. Sharkansky

[57] ABSTRACT

A beam is directed to an interfering source to obtain the best estimate of this signal. The beamformer output is fed into an inverse beamformer in such a way that the total delay experienced by a signal from any element of the array is the same as that of other elements in the array. Each output from the inverse beamformer is a spatially filtered replica of the signal received by the corresponding array element except for a fixed time delay constant for each element. The same delay is imparted in a second channel to each of the array outputs which are substituted from the corresponding inverse beamformer outputs. If the amplitude and delay of each signal to the subtracter are equal, the outputs from each of the subtracters will no longer contain signal components from the direction of the interfering signal.

12 Claims, 3 Drawing Sheets

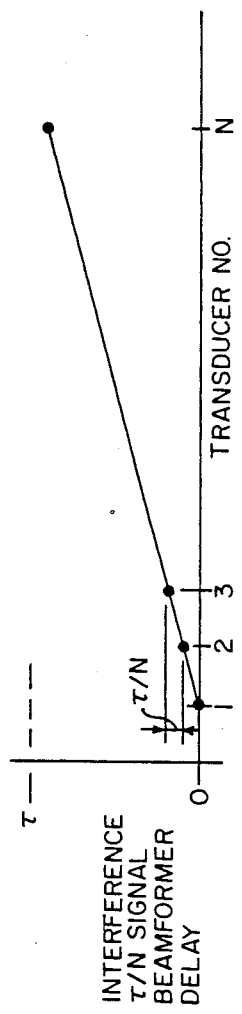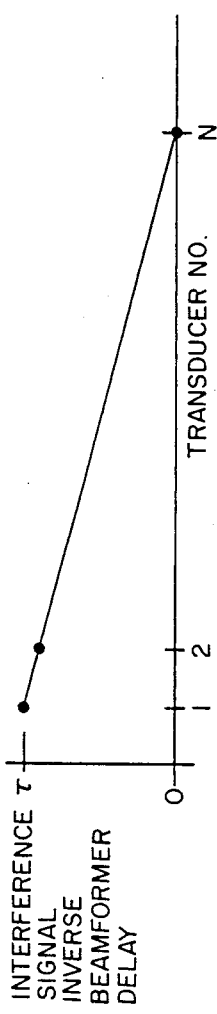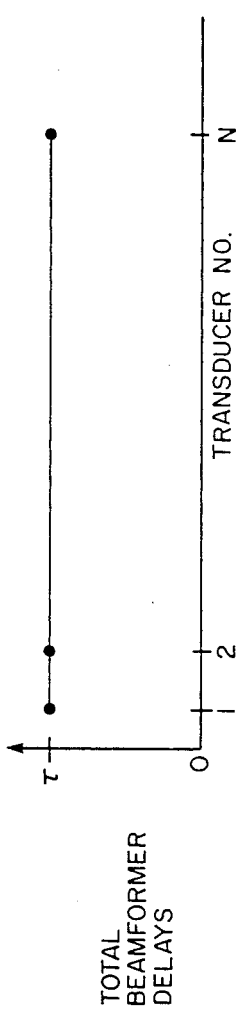

INTERFERENCE SOURCE NOISE CANCELLING BEAMFORMER

This application is a continuation of application Ser. No. 081,215 filed Aug. 4, 1987, now abandoned.

BACKGROUND OF THE INVENTION

This invention relates to adaptive beamformers and more particularly to adaptive beamformers for use in sonar and radar receivers which are capable of discriminating against interfering sources while providing the desired target signal.

Arrays of sonar transducers or radar receivers have a maximum response axis or antenna beam direction which can be steered by applying linear phase weighting across a linear array. The beam can be shaped by amplitude and phase weighting of the outputs of the array elements. Most arrays are built with fixed weights designed to produce a pattern that is a compromise between resolution, gain and low sidelobes. Adaptive systems that can sense and respond to a time-varying environment have been applied to arrays in order to reduce the susceptibility of the receiver attached to the array to jamming or interference. The degradation in the signal-to-noise ratio performance of a receiving system to the desired signal is caused by undesired noise which intrudes via the array sidelobe and mainlobe. The noise may consist of a deliberate interfering signal and natural noise sources. The degradation and signal-to-noise is often further aggravated by multi-path and a changing interference environment. Adaptive array techniques have been utilized as solutions to removing interference by the flexible capabilities for automatic null steering in the spatial domain.

Many adaptive array systems have been proposed with a typical adaptive array performing spatial filtering by sensing automatically the direction of a source of interference and forming a retrodirective receive beam in that direction to subtract from its normal (unadapted) beam which is responsive to the source of interference on one of its sidelobes. The retrodirective beam denotes a receive beam automatically formed in the direction of a single source of interference. The adaptive array forms a retrodirective receive beam by cross-correlating the received element signals with a received reference signal. The reference signal may consist of the output of a separate antenna or the output of the array. In either case, the basic principle is that of the cross-correlation interferometer.

These sophisticated adaptive beamformers, which can effectively remove any number of interfering sources from the beamformer outputs, are relatively complex and expensive.

SUMMARY OF THE INVENTION

It is therefore an object of this invention to provide an interference cancelling system which is especially useful when the number of interference sources is relatively few and which is relatively simple and inexpensive.

In the invention, a beam is steered in the direction of the interfering source to obtain the best estimate of this signal. The beamformer output is fed into an inverse beamformer in such a way that the total eelay experienced by a signal from any element of the array is the same as that of other elements in the array. Each output from the inverse beamformer is a spatially filtered replica of the signal received by the corresponding array element except for a fixed time delay constant for each element. The same delay is imparted in a second channel to each of the array outputs which are subtracted from the corresponding inverse beamformer outputs. If the amplitude and delay of each signal to the subtracter are equal, the outputs from each of the subtracters will no longer contain signal components from the direction of the interfering signal. The cancellation technique of this invention holds true for any direction of the interfering source and also for multiple sources of interference.

BRIEF DESCRIPTION OF THE DRAWINGS

The aforementioned aspects and other features of the present invention will be apparent from the following description taken in conjunction with the accompanying drawings wherein;

FIG. 2a-2c the delays provided by the beamformer and inverse beamformer of the interference channel.

DESCRIPTION OF THE PREFERRED EMBODIMENT

Figure 1:
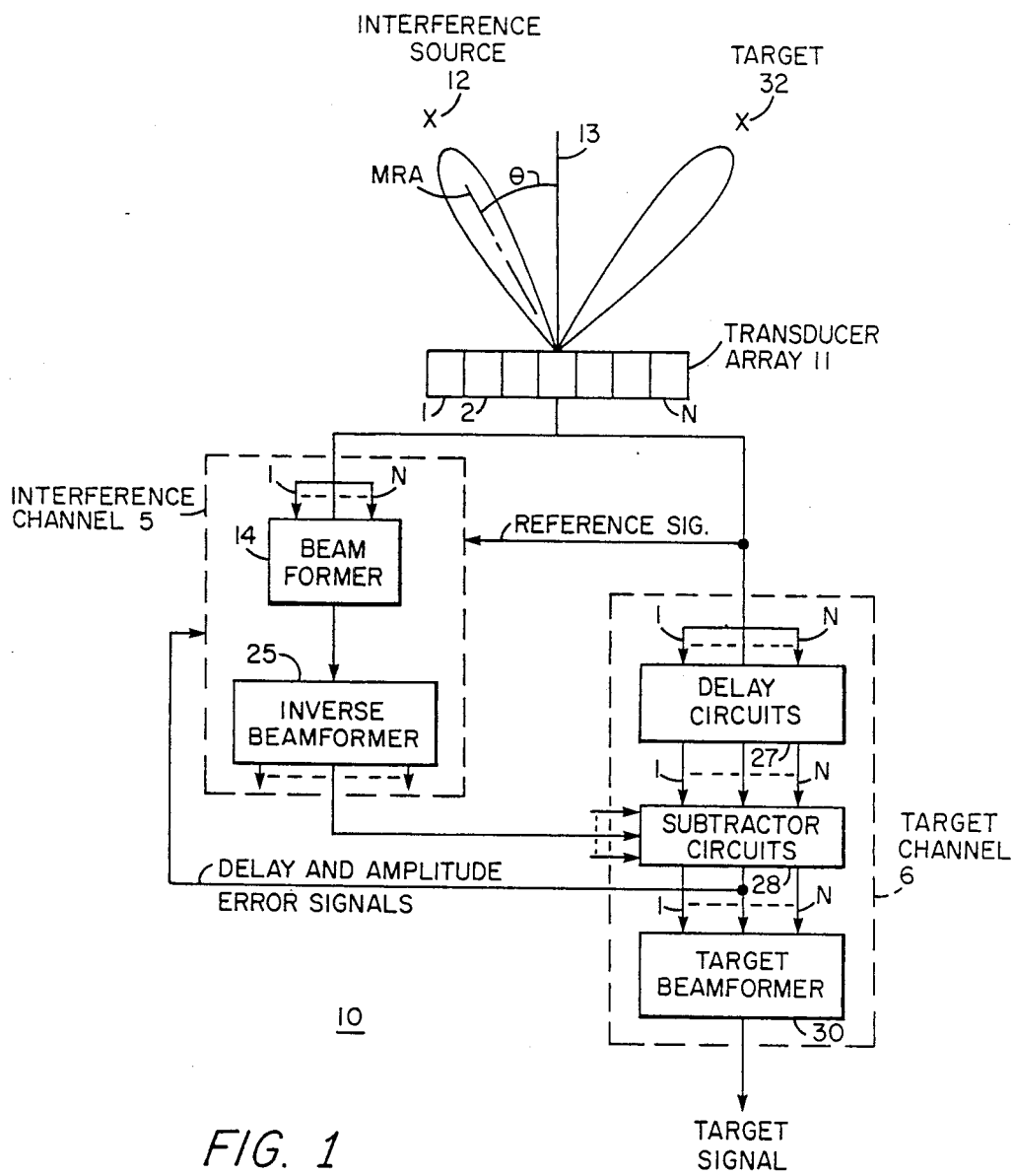
FIG. 1 is a block diagram of the interference cancelling beamformer system of this invention.

A basic system block diagram showing the interference channel 5 and the target channel 6 together with the receiving array 11 of the interference signal canceller system 10 of the invention is shown in FIG. 1. Assuming a line array 11 with N equally spaced receiving or transducer elements 1, 2, N; beamformer 14 is steered by conventional time delay beamforming techniques in the direction of the interfering source 12 which is at an angle $\theta$ measured between the maximum response axis MRA and the normal 13 to the line of the array 11. It will be assumed that the signals arriving from the interference signal source 12 impinge upon the linear array transducers 1, 2, 3, ..., N with a delay relative to transducer 1 which is a multiple $(k-1)$ of delay $\tau/N$ as shown in FIG. 2A (k being the number of the transducer). A beamformer acts like a spatial filter by eliminating signals originating from directions other than the maximum response axis. The interference signal output from beamformer 14 is controlled in delay $\Delta\tau$ and amplitude and entered into the inverse beamformer 25 which provides N outputs from interference channel 5 to a subtraction circuit 28 of target channel 6. The N outputs from the array 11 are also each given a delay $\tau + \Delta\tau$ in target channel 6 which is slightly larger than the combined delay $\tau$ of beamformer 14 and inverse beamformer 25 of the N outputs of interference channel 5.

The delay $\tau + \Delta\tau$ is provided by the delay circuit 27 in the target channel 6. The N outputs from the interference channel 5 are subtracted in subtraction circuits 28 from the corresponding N array element signals after the element signals have been passed through delay circuits 27. For complete cancellation by subtractor circuits 28 of the signals originating from the interference source 12, it is desired that the N outputs from the interference channel 5 match the delayed element outputs from delay circuit 27 in both phase and magnitude. For this purpose, FIG. 1 shows target channel 6 providing a reference signal and delay and amplitude error signals to interference channel 5. Circuitry in channel 5 for accomplishing this result is not shown in FIG. 1 for simplicity of presentation and will be provided later in conjunction with FIG. 3. The N outputs from the subtraction circuit 28 correspond to N interference-free signals from the N elements of transducer 11 differing from the actual N element signals in that the signal components produced in each element by the interference source 12 have been cancelled. The N outputs from subtraction circuit 28 are provided as inputs to target beamformer 30 which provides at its output 31 a target signal from target 32 and absent signals from interference source 12. Target beamformer 30 is controlled by conventional steering techniques to have its main response access or beam directed to target 32. Alternatively, beamformer 30 may have multiple outputs each corresponding to a different beam. In either case, the interference source 12 signal will not appear in the beamformer 30 output(s).

FIG. 2A shows the delay for each element 1, 2, . . . N of the linear array in the beamformer 14. FIG. 2B shows the inverse slope of the delay for corresponding elements provided by th inverse beamformer 25. FIG. 2C shows the total delay $\tau$ of beamformers 14 and 25 to be the same for each element of the array which provide spatially filtered interference signals which are subtractively combined with equally delayed signals provided by each element of the array to produce cancellation of the interference signals detected by each element.

Figure 3:
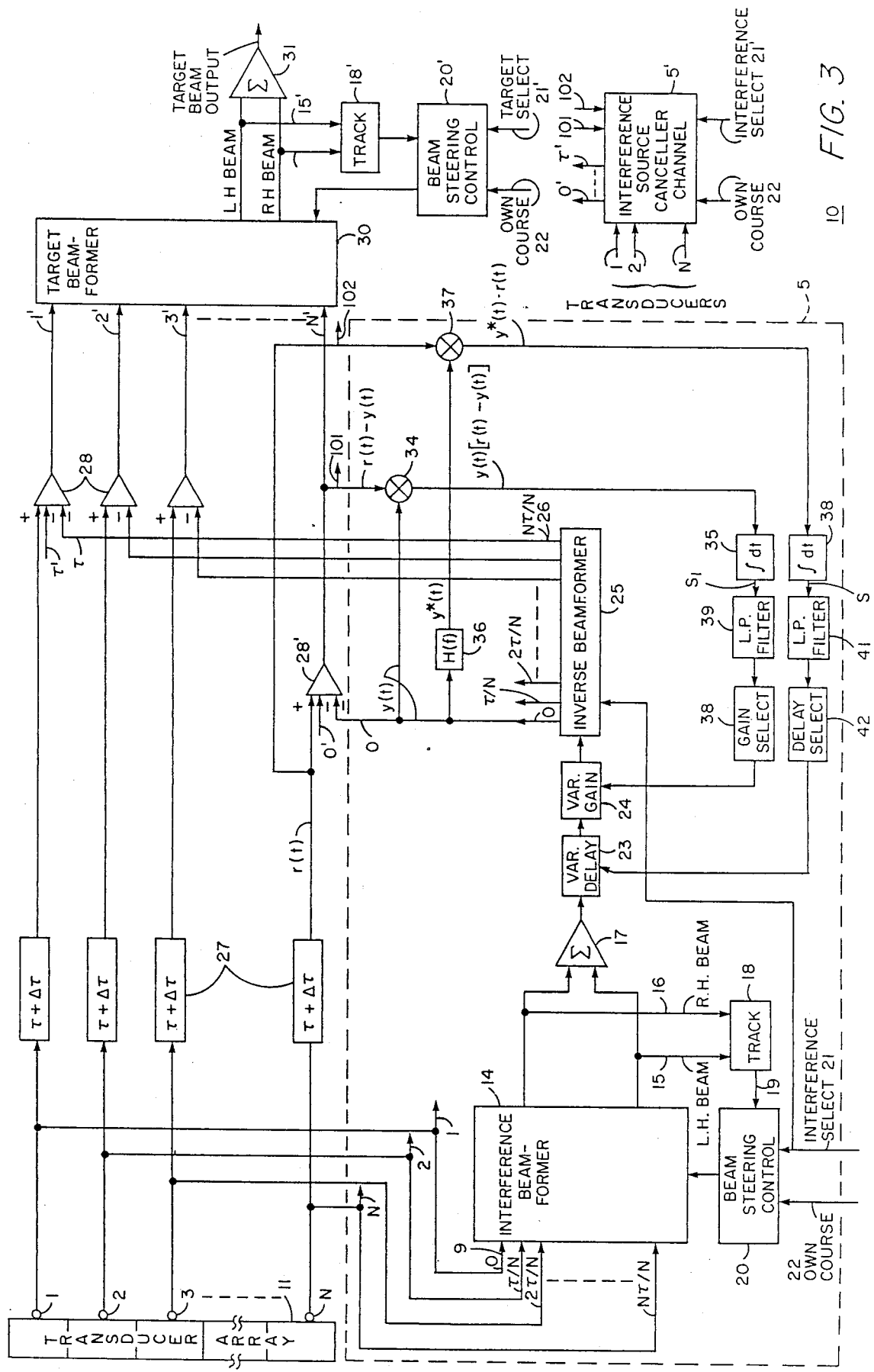
FIG. 3 is a detailed block diagram of the system of this invention.

Referring now to FIG. 3, there is shown a preferred embodiment of the interference rejection system 10 of this invention. The transducer array 11 comprises a plurality of individual transducer elements 1, 2, . . . , N arranged in one of many conventional assemblies such as a line array, a spherical array or a cylindrical array as is well known to those skilled in the art. For the purpose of describing the invention, it will be assumed that the array 11 is a line array of equally spaced transducers 1, 2, . . . , N with a source of interference signals 12 located at an angle $\theta$ with respect to the direction line 13 which is transverse to the array 11. The signals from the transducers 1, 2, . . . , N are applied to their respective inputs of the interference signal beamformer 14 which is a conventional beamformer well known to those skilled in the art which introduces compensating delays, 0, $\tau/N$, . . . , N $\tau/N$, as indicated on FIG. 3, to cause the signal from each of the transducers 1, 2, . . . , N to be in-phase for a direction $\theta$ determined by the delay difference $\tau/N$ provided in the beamformer 14 between adjacent transducer inputs, as is well known to those skilled in the beamformer art. The delays to each transducer element signal are provided within the beamformer before they are summed to provide a left-half beam 15 and a right-half beam 16 which are used for tracking. A full beam is provided by summing the left and right half beams in summer circuit 17. Tracking of the interference source using the left-half beam signal on line 15 and the right-half beam signals on line 16 by a tracking circuit 18 which provides an error signal on line 19 to beam steering control 20 is also well known to those skilled in the art. The beam steering control 20 also has signal inputs from an interference select signal 21 which determines the direction $\theta$ in which the interference beamformer is pointed thereby selecting which interference target is on the maximum response axis of beamformer 14. An "own course" signal 22 is provided to control 20 by a gyroscope (not shown) which provides a signal to correct for the attitude of the ship carrying the system 10 relative to a predetermined direction. The signals 21, 22 relieve the burden on the tracking circuit 18 so that the range of control signals on line 19 may be more limited and easier to obtain from the tracking circuit 18.

The output signal from the summer 17 is provided to a variable delay in series with a gain control circuit 24 whose output is provided to an inverse beamformer 25. The inverse beamformer provides that the total delay $\tau$ of a signal provided by a transducer element is the same from each transducer and is also controlled by interference select signal 21. For example, the transducer 1 signal provided at terminal 9 of beamformer 14 experiences zero delay in beamformer 14 and maximum delay $\tau$ in inverse beamformer 25 to result in a total delay of $\tau$ at the associated output 26 of the inverse beamformer 25. The inverse beamformer 25 provides N spatially filtered signals, each with a time delay $\tau + \Delta\tau$, corresponding to each of the signals received on the transducers 1—N from the interference signal 12 to which the interference beamformer 14 is directed. The additional delay $\Delta\tau$ is provided by variable delay circuit 23 whose operation is described subsequently.

The signals provided by the transducers 1, 2, . . . , N are also transmitted through individual delay elements 27, each having a delay $\tau + \Delta\tau$. The outputs of the delay units 27 are provided to the positive inputs of subtractor circuits 28, each of whose other negative inputs are connected to the corresponding output of the inverse beamformer 25. Thus, transducer 1 delayed signal is provided as a positive input to a subtractor circuit 28 whereas its corresponding output on line 26 of inverse beamformer is provided as a negative input to the same subtractor circuit 28. It should be noted that the transducer/signal in "0" time delay path of the beamformer 14 and $\tau$ time delay path of the corresponding inverse beamformer 25 together with the delay $\Delta\tau$ of circuit 23 total $\tau + \Delta\tau$ which is the same as the delay $\tau + \Delta\tau$ of circuit 27 directly connected to transducer 1. The output signals of subtractor 28, 28' are provided as inputs to target beamformer 30 whose inputs 1', 2', . . . , N' are appropriately phase shifted to provide target 32 signal output on line 31 form a beam where maximum response axis is directed at the target signal 32. Beamformer 30 is preferably provided with an automatic tracker 18' which may be of the type known in the art comprising left- and right-half beam signals 15', 16'. Target select signal 21" and "own course" signal 22 corresponding to signals 21 and 22 previously discussed, are provided to beam steering control 20 to facilitate tracking the target 32.

As previously stated, for complete cancellation of the interference source, it is necessary that the N outputs from the inverse beamformer to the subtractors 28 match the N delayed element outputs of delay circuits 27 in phase and magnitude. For an ideal array, it is necessary and sufficient to adjust the output from the beamformer/inverse beamformer channel 5 steered to the interference source to obtain the null. To make these adjustments automatically, the following process is employed:

The output of one of the subtractors 28 is correlated against the associated inverse beamformer output, low pass filtered and used to control magnitude of the inverse beamformer output. In parallel with this, the inverse beamformer output is passed through a Hilbert transform and also correlated with the other subtractor input. Again, low pass filtering provides a signed output used to increase or decrease the Vernier/delay. The circuitry for automatic control is described in subsequent paragraphs.

To illustrate the mechanization of tracking amplitude and delay, it is assumed that the interference consists of a single sinusoidal tonal:

$$e_i = B \sin\omega(t+\tau)$$

Further, that an element output of inverse beamformer output is described by:

$$e_o = A \sin\omega t$$

The output from an element subtractor circuit 28 is then simply:

$$A \sin\omega t - B \sin\omega(t+\tau)$$

After correlation by multiplication with A sin$\omega t$ and filtering by integration the resulting signal $S_1$ is:

$$S_1 = (1/T) \int_0^T [A \sin \omega t - B \sin \omega (t + \tau)] A \sin \omega t \, dt$$
$$\cong A - B \cos \omega\tau$$
$$\cong A - B - \omega\tau \text{ for small } \omega\tau$$

Similarly, after a Hilbert transform, $e_o = A \cos \omega\tau$ and after correlation with the output of the subtractor circuit output and filtering by integration gives the resulting signal $S_2$:

$$S_2 = (1/T) \int_0^T [A \sin \omega t - B \sin(\omega t + \tau)] A \cos \omega t \, dt$$
$$S_2 \cong B \sin \omega\tau$$

The $S_2$ channel signal is similar to a bearing deviation indicator function with sign change and a null independent of B. The $S_1$ channel is sensitive both to amplitude and phase but as $\omega\tau$ approaches zero, the phase angle becomes less and less important so amplitude control only is obtained in the $S_1$ channel.

Additionally, if not a single tonal but an arbitrary band limited analytical signal is considered, the control loop functions will not change. The beamformer 14 output steered to the interference source 12 has a flat response over the whole frequency range. If the beamformer 14 is off target, the system will still find the best null but the output from the subtracter 28 will contain a spectral residue from the interference source. It is therefore desirable that circuitry 18, 19 as previously described be provided to automatically track the interfering source.

Referring again to FIG. 3, in order to obtain cancellation of the interference signal, the delayed signal r(t) from one of the array 11 transducers (transducer N for example) is applied as one input to subtractor circuit 28' whose other input is the signal, designated at y(t), from the inverse beamformer output "0". The output signal [r(t)−y(t)] of subtraction circuit 28' is cross-correlated with the signal y(t) in multiplier 34 whose output y(t)[r(t)-y(t)] is provided to integrator 35 and an optional low pass filter 39. The polarity and magnitude of the low pass filter 39 output is provided as a gain coefficient to gain select circuit 38 which controls the variable gain amplifier 24. The gain of amplifier 24 is adjusted to cause the output signal of the subtractor circuit 28' to be minimized by matching the amplitude of a output line 0 of inverse beamformer 25 to the signal r(t) from the corresponding transducer element N.

Control of the phase of the signal y(t) applied to the subtractor circuit 28' is obtained by providing a 90° phase shift in the Hilbert transform circuit 36 whose output signal y*(t) is multiplied with the signal r(t) in multiplier 37 to provide the signal y*(t) r(t) to the integrator 38 and optional low pass filter 41. The polarity and magnitude of the output signal of filter 41 after passing through a delay select circuit 42 determines whether the time delay provided by the variable time delay circuit 23 is increased or decreased in order to minimize the correlation signal at the output of multiplier 37. Delay select circuit 42 provides the appropriately DC shifted and amplified signal to variable delay circuit 23.

The output from the subtractors 28 can be viewed as belonging to a set of elements of a line array identical to the original input except that the spatial response of each element now shows a null in the direction of the interfering source. These outputs can now be used in a conventional beamforming system 30. The result of system 30 will be a set of beams if target tracker 18' is not used and beamformer 30 is so constructed as is known in the art from which data originating at the interfering source is absent.

In FIG. 3, it was tacitly assumed that positional and spectral response errors have a negligible effect on the interference elimination process: For that case, it is sufficient to do the servo loop adjustment with a single element and derive the necessary time delayed replicas from this data for use in the other elements. This assumption is not unreasonable since element relative position and frequency response have to be held to close tolerances anyway in order to satisfy the system requirements of main to sidelobe response. Starting with an array and beamformer designed to meet a main to sidelobe response ratio of 25 dB, an interference reduction of at least this magnitude can be expected.

For cylindrical and spherical arrays in a baffle configuration, the null seeking operation will have to be extended to all elements involved in forming the interference and target beam because the elements of the arrays are shielded by the baffling and may not see the same signal from a source as other elements. With baffling absent, the cylindrical and spherical arrays are used as is the linear array of the preferred embodiment with the beamformer and inverse beamformer designs well known to those skilled in the art to provide the same total delay for each element of the array from input to output of the interference source canceller channel 5.

The technique of this invention can readily be extended to solve multiple interference cases. For an additional source of noise interference, the interference source cancellation channel 5 of FIG. 3 is replicated and shown on FIG. 3 as channel 5'. The operation of channel 5' is the same as that for channel 5; the only difference being that the interference select signal 21' steers the interference beamformer contained in channel 5' (and to provide the compensating time delays to the element channels of the inverse beamformer in channel 5') to cause the maximum response axis to be directed at the additional source of interference. The canceller channel 5' inverse beamformer outputs 0', . . . , N' are provided as additional cancellation signals to the respective subtractor circuits 28, 28'. The inputs 101, 102 and transducer elements 1, ..., N of canceller 5' are the same as those of canceller 5. The correlation detection of the output signal of subtractor circuit 28' with the element N signal r(t) in cancellers 5, 5' separates the interference signals of the assumed two interference sources. It should be understood that the correlation detection of either interference canceller channel 5, 5' may be made with the output signnal of any subtractor circuit 28 and the input signal from inverse beamformer 25 to the same subtractor circuit.

It should be understood that the invention has applicability to radar interference cancellation beamforming systems even though the invention has been described in the context of a sonar system. For radar applications, the fixed and variable time delay components and circuits would be replaced with corresponding phase shift components and circuits, and the transducer elements 1, ..., N would be radar frequency receiving elements.

Having described a preferred embodiment of the invention, it will now be apparent to one of skill in the art that other embodiments incorporating its concept may be used. It is believed therefore that this invention should not be restricted to the disclosed embodiment, but rather should be limited only by the spirit and scope of the appended claims.

What is claimed is:

1. An interference cancelling receiving array system comprising:
   an array of receiving elements forming said array; each receiving element providing a signal;
   a first beamformer having a plurality of inputs each connected to one of said array element and providing a first output signal;
   means for steering a main response axis of said first beamformer to a source of interference;
   a first delay means;
   an inverse beamformer input connected to the output of said first beamformer through said first delay means, said inverse beamformer having a first plurality of delayed outputs corresponding to said first beamformer inputs;
   second means delaying the signal provided by each of said array elements to provide a second plurality of delayed array element signals each delayed by substantially the sam(R)delay as each corresponding delayed output of said inverse beamformer;
   means for subtracting each said delayed signal from the corresponding output of said inverse beamformer to provide a plurality of interference cancelled signals each corresponding to an array element signal;
   a second beamformer having each of said plurality of interference cancelled signals applied to a corresponding input of said second beamformer and providing a second output signal from its formed beam which are substantially free of a signal from said interference source; and
   third variable delay means responsive to one output signal of said inverse beamformer and to a corresponding one of said delayed array element signals to provide a controlled time delay of the output signal of said first beamformer so that the signals provided to said means for subtracting are equally delayed.

2. The system of claim 1 wherein said first responsive means comprises:
   a ninety-degree phase shifter; and
   said phase shifter providing a ninety-degree phase shift of said one output signal of said inverse beamformer.

3. The interference cancelling system of claim 2 wherein said first responsive means comprises:
   a first correlator comprising a first multiplier and a first integrator;
   said phase shift being connected between one input of said first multiplier and said one output of said inverse beamformer;
   said multiplier having a second input connected to said one of said delayed array element signals; and
   the output of said first multiplier being connected to said first integrator.

4. The system of claim 3 wherein said first responsive means further comprises:
   a variable delay circuit;
   first means connecting said integrator output to said variable delay circuit to control the delay provided by said circuit in response to the first integrator output signal; and
   said variable delay circuit being connected between said first beamformer and said inverse beamformer.

5. The system of claim 4 wherein said first connecting means comprises:
   a first low-pass filter; and
   a delay select circuit serially connected between said first low-pass filter and said variable delay circuit.

6. The interference cancelling system of claim 1 comprising in addition:
   second means responsive to one output signal of said inverse beamformer and to an output of a corresponding one of said means for subtracting to provide an amplitude control of the output signal of said first beamformer.

7. The system of claim 6 wherein said second responsive means comprises:
   a second correlator;
   said second correlator having its inputs connected to said one output signal of said inverse beamformer and to said corresponding one of said output of said means for subtracting;
   means for controlling the amplitude of said first beamformer output signal; and
   said correlator having its output connected to said controlling means to cause the amplitude of said first beamformer output signal to be responsive to the output of said correlator.

8. The system of claim 7 wherein said second correlator comprises:
   a second multiplier;
   a second integrator serially connected to the output of said second multiplier; and
   said second multiplier having one input connected to said one output of said inverse beamformer and a second input connected to said output of said means for subtracting.

9. The system of claim 8 wherein said means for controlling the amplitude comprises:
   a variable gain circuit;
   second means connecting said second integrator output to a control input of said variable gain circuit to control the gain of said gain circuit in response to said second integrator output circuit; and
   said variable gain circuit being connected between said first beamformer and said inverse beamformer.

10. The system of claim 9 wherein said second means connecting comprises:

a second low-pass filter; and a gain select circuit serially connected between said second low-pass filter and said variable gain circuit.

11. A method of cancelling an interference signal and detecting a target signal comprising:

- detecting by a plurality of receiving element an interference signal from an interference source having a direction relative to said receiving elements, each receiving element providing a signal;
- connecting said elements to corresponding inputs of a first beamformer;
- steering a maximum response axis of said first beamformer in the direction of said interference source to provide a first beamformer output signal;
- controlling the time delay of the first beamformer output signal;
- providing the delayed output signal of said first beamformer to the input of an inverse beamformer;
- providing each of a plurality of outputs of said inverse beamformer as inputs of respective ones of a plurality of subtractor circuits;
- each of said plurality of outputs of said inverse beamformer having a first time delay relative to the corresponding signal of each of said receiving elements;
- delaying the signals provided by each of said receiving elements by an amount of the first time delay of a corresponding output of said inverse beamformer;
- controlling the delay of a delay circuit between said first beamformer and said inverse beamformer by correlating said delayed signal from one of said receiving elements with a corresponding one of said outputs of said inverse beamformer to provide a control signal for said delay circuit;
- providing each of the delayed signals to respective ones of said subtractor circuits, a corresponding delayed signal and inverse beamformer output signal being applied to the same subtractor circuit;
- providing the output signal of each subtractor circuit as an input signal to a corresponding input of a second beamformer;
- steering a maximum response axis of said second beamformer in the direction of a target source signal direction; and
- providing the target source signal at the output of said second beamformer.

12. The system of claim 1 comprising in addition:

means for steering a maximum response axis of said second beamformer to a target source of signals.

* * * * *